United States Patent [19]
Castro et al.

[11] 3,821,390
[45] June 28, 1974

[54] TREATMENT OF SWINE DYSENTERY

[75] Inventors: Francisco Carrasco Castro; Carlos Badiola Navarro, both of Madrid, Spain

[73] Assignee: American Cyanamid Company, Stamford, Conn.

[22] Filed: Mar. 16, 1973

[21] Appl. No.: 341,827

[52] U.S. Cl. .............................................. 424/270
[51] Int. Cl. .......................................... A61k 27/00
[58] Field of Search .................................. 424/270

[56] References Cited
OTHER PUBLICATIONS
Chem. Abst. Subject Index (Vol. 56–65), 1962–1966, page 22, 611S.

*Primary Examiner*—Sam Rosen
*Attorney, Agent, or Firm*—Edward A. Conroy, Jr.

[57] ABSTRACT

This disclosure describes compositions of matter useful for the treatment and prophlaxis of hemorrhagic colitis in swine and the methods of controlling and preventing hemorrhagic colitis in swine therewith, the active ingredient of said compositions of matter being 2-acetylamino-5-nitrothia-zole.

2 Claims, No Drawings

TREATMENT OF SWINE DYSENTERY

BRIEF SUMMARY OF THE INVENTION

This invention relates to novel compositions of matter useful in the veterinary field for the treatment and prophylaxis of hemorrhagic colitis in swine. More particularly, it relates to thereapeutic and prophylactic compositions containing 2-acetylamino-5-nitrothiazole which are useful for the treatment and prevention of hemorrhagic colitis in swine. The invention includes not only the new compositions of matter but also the methods of controlling and preventing hemorrhagic colitis in swine. Our invention is based upon the discovery that 2-acetylamino-5-nitrothiazole not only possesses unexpectedly high activity against hemorrhagic colitis in swine, but also increases feed efficiency and promotes growth of swine when administered to them at low concentrations in the diet.

DETAILED DESCRIPTION OF THE INVENTION

Swine dysentery (bloody scours, hemorrhagic colitis) is one of the most destructive diseases encountered in swine husbandry. It is a widespread disease affecting all continuents, and when observed in pigs it is generally characterized by one or more of the following signs: diarrhea, stunted growth, staggering gait, swelling of the eyelids, and coarseness of the hair. Although the severity of the disease varies from animal to animal, it nevertheless must be considered as one of the most important economic and clinical problems encountered in the rearing of swine. This is evidenced by the fact that dysentery infections in pigs generally result in 25% mortality of the herd, and frequently produce 100% mortality. Moreover, diseased animals show a rapid loss of weight, and those cleared of the disease are subject to relapse and generally have a low market value.

In an attempt to overcome these difficulties and reduce losses due to the disease, a major effort has been made by researchers throughout the world to determine the origin of the disease in swine herds, and to provide an effective cure for the animals. While these efforts have met with some success, there still remains much to be done in each of these areas. For example, the origin of swine dysentery has not yet been clearly determined, although several organisms, such as Treponema, Vibrio, and Salmonella, have been found to be associated with outbreaks of the disease. Likewise, a plethora of prophylactic and therapeutic agents have been tested and have been found to be partially effective in reducing dysentery infections and/or curing infected animals. However, none of the treatments heretofore utilized have been entirely satisfactory, even though such treatments have included a wide variety of drugs. Among the drugs utilized are the sulfa drugs, tetracycline-type antibiotics, mycin drugs, concentrated salines and alkalines, and arsenicals.

In accordance with this invention, we have found that 2-acetylamino-5-nitrothiazole effects a complete cure of hemorrhagic colitis in swine when administered orally to infected swine in amounts ranging from about 6.25 mg. to about 100 mg. per kilogram of body weight per day. A preferred dosage regimen for optimum results would be from about 12.5 mg. to about 50 mg. orally per kg. of body weight per day. Such dosage units are employed that a total of from about 100 mg. (for a 16 kg. piglet at 6.25 mg./kg.) to about 10.0 grams (for a 100 kg. hog or sow at 100 mg./kg.) of active ingredient are administered orally in a 24-hour period. The daily dosage may be administered as a single oral dose or as divided doses depending upon the exigencies of the therapeutic situation.

The dosage units of active compound may contain other inert or medically active materials, for instance, when the dosage unit form is a tablet, pill or granules, there may also be present various binders, fillers or solid diluents. Suitable materials for this purpose may be, for example, starch, such as corn starch, or sugar such as lactose or sucrose. When the dosage unit form is a capsule, it may contain in addition to materials of the above type a liquid carrier such as a fatty oil. The dosage unit form may also have present excipients such as dicalcium phosphate. Various other materials may be present as coatings or to otherwise modify the physical form of the dosage unit, for instance, pills or capsules may be coated with shellac, sugar or both. Of course, any material used in preparing the dosage unit form should be pharmaceutically pure and substantially non-toxic in the amounts employed.

Where the drug is to be administered as a single oral dose, for example in a therapeutic treatment, 5.25% by weight of the drug may be mixed with 4.25% by weight of hydroxystearin and 90.50% by weight of sesame oil. This formulation is administered by a syringe as an oral paste and will provide about 250 mg. of drug per cubic centimeters (cc). It is, of course, obvious that a higher concentration of the drug can be achieved by altering the quantities of drug and sesame oil accordingly.

For prophylactic administration, the active ingredient is preferably administered either in the feed or in the drinking water at levels of from about 25 to about 500 parts per million, and preferably at levels of from 100 to 250 parts per million. This treatment is usually effective when administered over about a one-day to two-week period, although the treatment period may be extended if so desired. For prophylactic or therapeutic treatment of swine via feed treatment, any conventional swine feed may be employed, and a typical feed is described in Example 1 below.

As indicated above, the 2-acetylamino-5-nitrothiazole is normally administered to the swine intimately mixed in the feed ration or drinking water for prophylaxis. The drug can be suitably prepared as a premix or feed supplement containing from about 1% to about 90% by weight of the formulation which can also contain various diluents or carriers. Carriers suitable for use to make up the feed supplement compositions include the following: soybean meal, alfalfa meal, cotton seed oil meal, linseed oil meal, cornmeal, cane molasses, urea, bone meal, corncob meal, dried fermentation whole harvest mash solids, and the like. The carrier promotes a uniform distribution of the drug in the finished feed with which the supplement is blended. It thus performs an important function by ensuring proper distribution of the drug throughout the feed. The feed supplement of premix containing the active ingredient can be readily mixed with the swine feed ration by any conventional technique for mixing feeds. For convenience in commercial use, it has been found that premixes containing from about 5% to about 15% by weight of the active compound are preferred. When administering the compound in drinking water, it has been found convenient to utilize water-soluble excipients, e.g., lactose, dextrose, tartaric acid. The powder can be added to drinking water to provide an effective concentration level of active compound of from about 0.0025% to about 0.05% by weight.

Also in accordance with this invention, we have found that the above-identified swine dysentery control agent can be used in combination with other drugs, such as antibacterial agents, antifungal agents, growth promoting agents, and the like, normally used in the raising of swine. In particular, we have found it advantageous to include in the diet of swine receiving 2-acetylamino-5-nitrothiazole, one or more of the following drugs administered in the prescribed concentration:

a. from about 5 to 150 ppm of a bis-(5-nitrofurfurylidene)-acetoneguanylhydrazone;
b. from about 10 to 300 ppm of a tetracycline antibiotic, such as chlortetracycline, oxytetracycline, tetracycline or demethylchlortetracycline;
c. from about 10 to 300 ppm of a sulfa drug, such as sulfadimethylpyrimidine or sulfaethoxypyridazine; and
d. from about 500 to 20,000 ppm of an alkali metal formaldehyde sulfoxylate or bisulfite, such as sodium formaldehyde bisulfite or sodium formaldehyde sulfoxylate.

A preferred combination of drugs to be used with either the prophylactic or the therapeutic swine dysentery treatment of this invention is the administration of 20 ppm of bis-(5-nitrofurfurylidene)-acetoneguanylhydrazone with or without 100 ppm of sulfadimethylpyrimidine and 100 ppm of chlortetracycline administered in the feed.

For a clearer understanding of the invention, specific examples of it are set forth below. These examples are merely illustrative, and are not to be understood as limiting the scope and underlying principles of the invention in any way.

EXAMPLE 1

The following trial, Trial I, was conducted to determine whether or not 2-acetylamino-5-nitrothiazole was effective when administered prophylactically in the feed against experimentally induced infections of swine dysentery.

Experimental Details

Materials:

| 1. Feed Supplement | Theoretical | Actual |
|---|---|---|
| Chlortetracycline | 100 gram/metric ton | 56–94 |
| Sulfadimethylpyrimidine | 100 gram/metric ton | 92–100 |
| Bis-(5-nitro-2-furfurylidene)-acetoneguanylhydrazone hydrochloride | 20 gram/metric ton | 18–22 |
| 2. 2-Acetylamino-5-nitrothiazole Technical Grade | Theoretical | Actual |
| Rate of use in feed: | 100 gram/metric ton | 96 |
|  | 150 gram/metric ton | 139 |
|  | 200 gram/metric ton | 175 |

The above quantities were premixed with basal feed to 10 kg. prior to their addition to the finished feed.

3. BASAL FEED

The basal feed was a typical commercial ration with 17.80% to 18.94% protein; 0.938% to 1.017% calcium; 0.698T to 0.784% phosphorus; 4.002% to 4.560% fiber; 2.490% to 2.904% fat; plus 1.050% lysine; 0.37% methionine; 0.790% methionine plus cystine; and 0.25% tryptophan. The feed was administered dry, ad libitum.

4. PIGS

One hundred forty-four (144) Large White X Landrace pigs, 72 castrated males and 72 females, were brought from a breeding farm. The average initial weight for the pigs per treatment was 14.277 kg. (range: 14.165 to 14.372 kg.) at the start of the trial.

| Plan of Experiment: Treatment Group | A | B | C | D | E | F |
|---|---|---|---|---|---|---|
| Feed Supplement |  |  |  |  |  |  |
| Chlortetracycline (ppm) | 0 | 0 | 100 | 100 | 100 | 100 |
| Sulfadimethylpyrimidine (ppm) | 0 | 0 | 100 | 100 | 100 | 100 |
| Bis-(5-nitro-2-furfurylidene)-acetoneguanylhydrazone hydrochloride (ppm) | 0 | 0 | 20 | 20 | 20 | 20 |
| 2-Acetylamino-5-nitrothiazole | 0 | 0 | 0 | 100 | 150 | 200 |
| Experimental Infection | – | + | + | + | + | + |
| No. pigs (total) | 24 | 24 | 24 | 24 | 24 | 24 |
| No. replicates | 4 | 4 | 4 | 4 | 4 | 4 |
| No. pig/replicate | 6 | 6 | 6 | 6 | 6 | 6 |

RECORDS/PIG

1. Weights at 0, 14, 28, and 42 days
2. Feed consumption at 14, 28, and 42 days
3. Appearance of signs of swine dysentery disease
4. Fecal moisture content
5. Fecal bacterial examination

5. EXPERIMENTAL INFECTION:

The method of infection used was a modification of the method described by J. W. Davis (1961) and J. W. Davis et al. (1968). Frozen colon and cecum obtained from pigs naturally infected with swine dysentery were ground and mixed with feed at the rate of 15 grams per 175 grams of feed. This amount was offered to and consumed by each pig by placing the infective material on the floor in the corresponding pens after a 16-hour fasting period. The pigs were infected on the seventh day following the start of feeding the feed additive diet in the trial.

6. ANALYSIS OF FECES:

Three to five samples of feces were collected per pen (four pens per treatment) from all treatment groups (6) in the trial 5 days after the start of the trial; that is, 2 days prior to experimental inoculation, for analysis of moisture content of feces, bacteriological identification and presence of blood. A fecal sample was also obtained for moisture content and bacteriological identification from each diseased pig as well as from some pigs 24 hours after treatment with acinitrazole.

The fecal samples were homogenized and analyzed as follows:

A. Moisture Content
1. Empty weight determination of a 60-ml. weigher after drying a 100° C. for one hour (P0).
2. Weighing of 8 to 10 grams homogenized feces in the 60-ml. weigher (P1).
3. Feces drying at 100° C. (±1° C.) till constant weight (approximately 5 hours).
4. Adjustment of the dry feces temperature to 20° C. to 22° C. in an oven and weighing with the 60-ml. weigher (P2).
5. Calculation: % moisture — [(P1-P0)-(P2-P0)] × 100P1-P9

B. Microbiology

Microscopic examinations were made for the presence of protozoa (Balantidium), and bacteria Treponema and Vibrio. Whenever a colony on the agar plates was suspected to be Salmonella; it was further investigated with special culture media.

C. Presence of Blood

The benzidine test was carried out, in case of doubt concerning the presence of blood in feces. To that effect, one to three drops of a fecal suspension were added to a mixture of 2 ml. 10% benzidine solution in acetic acid and 2 ml. hydrogen peroxide (10 volumes). A blue to dark-green color reaction, following slight agitation, is indicative for blood.

RESULTS

2-Acetylamino-5-nitrothiazole at theoretical dosages of 100, 150, and 200 ppm in the diet of pigs prevented the onset or appearance of clinical signs of swine dysentery in all pigs and aided in the continued excellent improvement of weight gains and efficacy as summarized in Table I. The combination of chlortetracycline, sulfadimethylpyrimidine, and bis-(5-nitro-2-furfurylidene)-acetoneguanylhydrazone hydrochloride did not prevent the onset of clinical signs of swine dysentery but aided in maintaining improved weight gains and feed efficiency. All pigs showing clinical signs of swine dysentery were treated with oral dosages of 2-acetylamino-5-nitrothiazole. The results of these therapeutic treatments are discussed in Example 3.

TABLE I

The Prophylactic Effect of 2-Acetylamino-5-nitrothiazole in the Prevention of Signs of Swine Dysentery and on Growth Performance in Pigs Challenged with Experimental Infections

| Treatment Group | A | B | C | D | E | F |
| --- | --- | --- | --- | --- | --- | --- |
| Feed Supplement* | − | − | + | + | + | + |
| 2-Acetylamino-5-nitrothiazole (ppm) | 0 | 0 | 0 | 100 | 150 | 200 |
| Experimental Infection | − | + | + | + | + | + |
| No. pigs diseased** | 2 | 9 | 10 | 0 | 0 | 0 |
| Total | 24 | 24 | 24 | 24 | 24 | 24 |

| Period | Average Daily Weight Gain (g) | | | | | |
| --- | --- | --- | --- | --- | --- | --- |
| 0–14 days | 263$^a$ | 297$^a$ (12.9) | 358$^c$ (36.1) | 333$^{bc}$ (26.6) | 336$^{bc}$ (27.7) | 323$^{ab}$ (22.8) |
| 0–28 days | 422$^a$ | 419$^a$ (−0.7) | 492$^b$ (16.6) | 508$^b$ (19.9) | 495$^b$ (17.3) | 517$^b$ (22.5) |
| 0–42 days | 488$^a$ | 491$^a$ (0.6) | 537$^b$ (10.0) | 548$^b$ (12.3) | 550$^b$ (12.7) | 569$^b$ (16.6) |

| | Average Feed Gain (g:g) | | | | | |
| --- | --- | --- | --- | --- | --- | --- |
| 0–14 days | 2.962$^a$ | 2.569$^b$ (−10.2) | 2.555$^{bc}$ (−13.8) | 2.395$^c$ (−19.2) | 2.405$^c$ (−18.8) | 2.508$^{bc}$ (−15.3) |
| 0–28 days | 2.629$^a$ | 2.597$^a$ (−1.2) | 2.413$^{bc}$ (−8.2) | 2.292$^{cd}$ (−12.8) | 2.429$^b$ (−7.6) | 2.254$^d$ (−14.3) |
| 0–42 days | 2.662$^a$ | 2.594$^a$ (−2.6) | 2.488$^b$ (−6.5) | 2.423$^b$ (−9.0) | 2.446$^b$ (−8.1) | 2.387$^b$ (−10.3) |

*Chlortetracycline (100 ppm.); sulfadimethylpyrimidine (100 ppm.); bis-(5-nitro-2-furfurylidene)-acetoneguanylhydrazone hydrochloride (20 ppm.).
**Appearance of blood in feces.
Figures in parenthesis refer to % difference from controls.
Figures which bear a common superscript are not significantly different at (P<0.05).

EXAMPLE 2

The following trial, Trial II, was conducted to further determine the prophylactic effect of 2-acetylamino-5-nitrothiazole at 100 ppm in a restricted diet against swine dysentery in older pigs. The results demonstrate the effectiveness of 2-acetylamino-5-nitrothiazole under the conditions of the experiment when compared with the candidate growth promotant, sodium formaldehyde bisulfite, which did not control swine dysentery at concentrations of 2,500 and 5,000 ppm in the diet.

Experimental Details

Materials:

| 1. Feed Supplement: | Experimental Concentration in Diet (ppm) |
|---|---|
| Bis-(5-nitro-2-furfurylidene)-acetone-guanylhydrazone hydrochloride | 10 |
| Copper | 125 |
| 2. 2-Acetylamino-5-nitrothiazole Technical Grade: | 100 |
| 3. Sodium Formaldehyde Bisulfite | 2.500 |
| | 5.000 |

4. BASAL FEED:

The basal feed was a typical commercial ration with 16.0%–16.48% protein; 0.854% to 0.902% calcium; 0.699% to 0.731% phosphorus; 5.18% to 5.70% fiber; 1.75% to 2.05% fat, 0.801% lysine; 0.31% methionine; 0.681% methionine plus cystine; and 0.23 % tryptophan.

5. PIGS

One hundred forty-four Large White X Landrace pigs. The average initial weight for the pigs at the start of this trial was 42.65 kg.

6. Procedures for experimental infections and clinical observations were the same as those described in Example 1. However, unlike Trial I, the pigs were experimentally inoculated with swine dysentery organisms only two days after being placed on the feed-additive diets instead of seven days as in Trial I.

Plan of Experiment:

| Treatment Group | A' | B' | C' | D' |
|---|---|---|---|---|
| Feed Supplement | | | | |
| Bis-(5-nitro-2-furfurylidene)-acetone-guanylhydrazone hydrochloride (ppm) | 0 | 10 | 0 | 0 |
| Copper (ppm) | 0 | 125 | 0 | 0 |
| Sodium formaldehyde bisulfite (ppm) | 0 | 0 | 2.500 | 5.000 |
| 2-Acetylamino-5-nitrothiazole (ppm) | 0 | 100 | 0 | 0 |
| Experimental Infection | + | + | + | + |
| No pigs | 24 | 24 | 24 | 24 |
| No. replicates | 4 | 4 | 4 | 4 |
| No. pig/replicate | 6 | 6 | 6 | 6 |

RECORDS/PIG

1. Weights at 0, 28, 56 and at 76 days.
2. Feed consumption at 28, 56 and at 76 days.
3. Appearance of signs of swine dysentery disease.
4. Fecal moisture content.
5. Fecal bacterial examination.

RESULTS

2-Acetylamino-5-nitrothiazole, at 100 ppm, in a restricted diet effectively reduced the incidence of swine dysentery when compared to the incidence observed in infected unmedicated control pigs and to the groups treated with sodium formaldehyde bisulfite at 2,500 and 5,000 ppm (Table II). Only two pigs in the group receiving the diet containing 2-acetylamino-5-nitrothiazole exhibited signs of swine dysentery after experimental infections were administered. Significantly higher number of pigs contracted the disease in the control and other treatment groups. Bis-(5-nitro-2-furfurylidene)-acetone-guanylhydrazone hydrochloride and copper sulfate are known not to be effective against swine dysentery. The activity of 2-acetylamino-5-nitrothiazole against swine dysentery is further demonstrated by the continued superior weight gains and feed efficiency compared to the control pigs, although, undoubtedly, the bis-(5-nitro-2-furfurylidene)-acetoneguanylhydrazone hydrochloride and copper contributed to the improved gain as well as the 2-acetylamino-5-nitrothiazole (Table II). Any pigs developing signs of swine dysentery were treated with a therapeutic dosage of 2-acetylamino-5-nitrothiazole; the results of these treatment are presented in Example 3.

TABLE II

The Effect of 2-Acetylamino-5-nitrothiazole, at 100 ppm, in Reducing the Incidence of Swine Dysentery and in Improving Growth Performance in Experimentally Infected Pigs

| Treatment Group | A' | B' | C' | D' |
|---|---|---|---|---|
| Feed Supplement* | 0 | + | 0 | 0 |
| Sodium formaldehyde bisulfite (ppm) | 0 | 0 | 2500 | 5000 |
| 2-Acetylamino-5-nitrothiazole (ppm) | 0 | 100 | 0 | 0 |

TABLE II.—Continued

The Effect of 2-Acetylamino-5-nitrothiazole, at 100 ppm, in Reducing the Incidence of Swine Dysentery and in Improving Growth Performance in Experimentally Infected Pigs

| Treatment Group | A' | B' | C' | D' |
|---|---|---|---|---|
| Experimental Infection | + | + | + | + |
| No. pigs diseased** | 8 | 2 | 9 | 12 |
| Total | 24 | 24 | 24 | 24 |

| Period | Average Daily Weight Gain (g) | | | |
|---|---|---|---|---|
| 0–28 days | 623 | 675 | 640 | 658 |
|  |  | (8.3) | (2.7) | (5.6) |
| 0–56 days | 599$^a$ | 713$^c$ | 623$^{ab}$ | 659$^{bc}$ |
|  |  | (19.0) | (4.0) | (10.0) |
| 0–76 days | 649$^a$ | 737$^{bc}$ | 676$^{ab}$ | 687$^{abc}$ |
|  |  | (13.5) | (4.2) | (5.8) |

| | Average Feed: Gain (g:g) | | | |
|---|---|---|---|---|
| 0–28 days | 3.520 | 3.283 | 3.360 | 3.405 |
|  |  | (−6.7) | (−4.5) | (−3.3) |
| 0–56 days | 3.573$^b$ | 3.294$^{ab}$ | 3.495$^{ab}$ | 3.537$^{ab}$ |
|  |  | (−7.8) | (−2.2) | (−1.0) |
| 0–76 days | 3.629 | 3.426 | 3.588 | 3.591 |
|  |  | (−5.6) | (−1.1) | (−1.0) |

*(Bis-(5-nitro-2-furfurylidene)-acetoneguanylhydrazone hydrochloride, 10 ppm; Copper, 125 ppm)
**Appearance of blood in feces
Figures in parenthesis refer to % difference from controls.
Figures which bear a common superscript are not significantly different at ($P<0.05$).

EXAMPLE 3

The purpose of these single oral tests was to determine the therapeutic dosages of 2-acetylamino-5-nitrothiazole for control of swine dysentery.

Experimental Details

Materials:

1. Plastic, oral-dose-type syringes each containing:

| | |
|---|---|
| *2-Acetylamino-5-nitrothiazole, technical grade | 250 mg. a.i./ml. |
| Hydroxystearin | 4.25% |
| Sesame oil; q.s. ad | 1 ml. |

*Analysis of three syringes gave an average 2-acetylamino-5-nitrothiazole assay value of 222.3 mg./ml.

EXPERIMENTAL ANIMALS:

The pigs used for these trials came from Trials I and II in Examples 1 and 2, respectively. Therefore, the procedures for experimental infections, etc. were set forth in the respective Examples.

Table III gives the number of pigs contracting swine dysentery from Trials I and II and the feed additive groups from which they came, and outlines the therapeutic dosages of 2-acetylamino-5-nitrothiazole administered.

RESULTS:

With respect to oral therapy with 2-acetylamino-5-nitrothiazole, dosages of 50, 25, and 12.5 mg./kg. produced clinical cures (with one exception) within 24 hours of the initial treatment (Table IV). Failure to effect a clinical cure (absence of blood in feces) occurred in one pig given 12.5 mg./kg. and in four pigs given 6.25 mg./kg. (Table IV). The pig given 12.5 mg./kg. responded to treatment with this dosage. Three pigs that failed to respond to 6.25 mg./kg. were successfully retreated with 20 mg./kg., but one of these relapsed 14 days later and was not retreated. One other pig relapsed six days after the first 6.25-mg./kg. does and was successfully retreated with 20 mg./kg. The incidence of relapse appeared to be unrelated to the dosage first administered.

The normal fecal moisture content in pigs was determined by the examination of 72 pigs in Trial I prior to exposure to swine dysentery organisms and was found to average 69.3%. The fecal analyses of infected pigs showed an increase of nearly 20 percent in moisture content during infection. Within 24 hours after treatment the moisture content dropped to an average 70.7 percent in the 20 cured pigs examined (Table V). In the five pigs where cures were not achieved, the av-

TABLE III

Incidence of Swine Dysentery and Oral Dosages of 2-Acetylamino-5-nitrothiazole Administered
(data shown by trial and feed additive group)

| | Trial I | | | Trial II | | | |
|---|---|---|---|---|---|---|---|
| Feed additive group | A | B | C | A' | B' | C' | D' |
| No. pigs with swine dysentery | 2 | 9 | 10 | 8 | 9 | 12 | 2 |

| Therapeutic treatment | Dosage (mg./kg.) | No. pigs treated | | Dosage (mg./kg.) | No. pigs treated | | | |
|---|---|---|---|---|---|---|---|---|
| Initial | (50) | 0 | 5 | 6 | (6.25) | 2 | 1 | 1 | 2 |
|  | (25) | 1 | 1 | 3 | (20) | 6 | 1 | 8 | 10 |
|  | (12.5) | 1 | 3 | 1 | | | | | |
| Second$^{(a)}$ | (25) | 0 | 3 | 0 | (20) | 3 | 0 | 3 | 1 |
|  | (12.5) | 1 | 3 | 1 | | | | | |

$^{(a)}$treatment of initial failures and relapses.

erage fecal moisture content remained at the pretreatment level.

TABLE IV

Effects of Therapeutic Doses of 2-Acetylamino-5-nitrothiazole in Control of Swine Dysentery in Experimentally Infected Pigs

| | First treatments of diseased pigs in 2-Acetylamino-5-nitrothiazole mg./kg. | | | | |
|---|---|---|---|---|---|
| | Trial I | | | | Trial II |
| | 50 | 25 | 12.5 | 6.25 | 20 |
| No. diseased pigs | 11 | 5 | 5 | 6 | 25 |
| No. pigs cured[a] | 6 | 5 | 2 | 2 | 23 |
| No. pigs not cured[b] | 0 | 0 | 1 | 4 | 0 |
| No. pigs relapsed[c] | 5 | 0 | 2 | 2 | 3[d] |
| No. retreatments (mg./kg.) | 3 (25) 2 (12.5) | 0 | 3 (12.5) | 4 (20) | 3 (20) |

[a] After one initial treatment and with no relapse.
[b] Not cured within 24 hours of first treatment.
[c] Relapse occurred in 2 of 4 pigs that failed to respond to first treatment.
[d] One pig relapsed twice; responded to third therapeutic dosage.

TABLE V

Results of Pre- and Post-Treatment Assays of Feces for Moisture Content

| | Fecal moisture[a] | | | |
|---|---|---|---|---|
| | % Pretreatment | (no. pigs) | % Post treatment | (no. pigs) |
| Pigs cured[b] | 91.0 | (38) | 70.7 | (20)[c] |
| Pigs not cured | 89.6 | (5) | 89.3 | (5) |

[a] Normal preinoculation assay 69.3% (66.2%–71.4%).
[b] Cured after one treatment and without relapse.
[c] Assay conducted on 20 pigs.

Salmonella were not found on special culture media prepared to identify these organisms. Direct microscopic examination of fecal suspensions from a large number of diseased pigs consistently revealed mobile forms similar to those described by Tesouro Vallejo (1969), Todd et al. (1970), Taylor and Alexander (1971), as well as by Harris et al. (1972) who called the organisms Treponema hyodysenteriae. In Example 3 these forms were either absent or rarely seen in feces following treatment. It should be pointed out, however, that the concentration of these forms is much smaller in hemorrhagic feces than in scrapings from diseased colon or cecum.

In summary, the trials in Example 3 demonstrated that single oral dosages of 20 mg. of 2-acetylamino-5-nitrothiazole per kg. of body weight, or higher dosages, were very effective in the therapeutic control of swine dysentery based on the immediate recovery (within 24 hours) from the classical signs of swine dysentery, namely, bloody diarrhea, increased moisture content (watery diarrhea), and the general absence of relapses after therapy. Dosages of 6.25 mg. and 12.5 mg. of 2-acetylamino-5-nitrothiazole per kg. were also effective.

We claim:

1. The method of treating hemorrhagic colitis in swine which comprises administering orally to infected swine an effective amount of 2-acetylamino-5-nitrothiazole in association with a pharmaceutical carrier to provide a daily dosage of from about 6.25 mg. to about 100 mg. per kilogram of body weight of said swine.

2. The method of treating hemorrhagic colitis in infected swine which comprises administering to said swine an oral ration containing an effective amount of 2-acetylamino-5-nitrothiazole.

* * * * *